United States Patent
Sharma et al.

(10) Patent No.: US 12,304,310 B2
(45) Date of Patent: May 20, 2025

(54) CONTROLLING GRAPHICS PROJECTOR BRIGHTNESS

(71) Applicant: GM Global Technology Operations LLC, Detroit, MI (US)

(72) Inventors: Manoj Sharma, Troy, MI (US); Thomas A. Seder, Fraser, MI (US); Joseph F. Szczerba, Grand Blanc, MI (US); John P. Weiss, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 18/321,082

(22) Filed: May 22, 2023

(65) Prior Publication Data
US 2024/0391316 A1   Nov. 28, 2024

(51) Int. Cl.
*B60K 35/00* (2024.01)

(52) U.S. Cl.
CPC .......... *B60K 35/00* (2013.01); *B60K 2360/25* (2024.01); *B60K 2360/332* (2024.01); *B60K 2360/334* (2024.01); *B60K 2360/349* (2024.01)

(58) Field of Classification Search
CPC .......... B60K 35/00; B60K 2360/25; B60K 2360/332; B60K 2360/334; B60K 2360/349; B60K 35/23; G09G 3/001; G09G 5/10; G09G 2380/10
See application file for complete search history.

(56) References Cited

U.S. PATENT DOCUMENTS

| | | | |
|---|---|---|---|
| 6,396,217 B1 * | 5/2002 | Weindorf | G09G 5/10 315/169.3 |
| 6,639,733 B2 | 10/2003 | Minano et al. | |
| 7,286,296 B2 | 10/2007 | Chaves et al. | |
| 2005/0086032 A1 | 4/2005 | Benitez et al. | |
| 2005/0243570 A1 | 11/2005 | Chaves et al. | |
| 2010/0253918 A1 | 10/2010 | Seder et al. | |
| 2017/0212633 A1 | 7/2017 | You et al. | |
| 2020/0254877 A1 | 8/2020 | Nakajima et al. | |
| 2021/0191132 A1 | 6/2021 | Karner et al. | |
| 2021/0360211 A1 | 11/2021 | Kawamura | |

FOREIGN PATENT DOCUMENTS

DE   102017004859 A1   3/2019

OTHER PUBLICATIONS

Dross, et al. "Non-imaging optics combine LEDs into one bright source," SPIE, Jun. 27, 2006, https://spie.org/news/0197-non-imaging-optics-combine-leds-into-one-bright-source?SSO=1.
U.S. Appl. No. 17/749,464, filed May 20, 2022.
U.S. Appl. No. 18/186,343, filed Mar. 20, 2023.

* cited by examiner

*Primary Examiner* — Rodney A Butler
(74) *Attorney, Agent, or Firm* — Vivacqua Crane, PLLC

(57) ABSTRACT

A system for controlling a brightness of a graphics projector for a vehicle includes a vehicle sensor, the graphics projector including at least one light source module, and a controller in electrical communication with the vehicle sensor and the graphics projector. The controller is programmed to determine an ambient light level using the vehicle sensor. The controller is further programmed to determine a projector brightness offset value based at least in part on the ambient light level. The controller is further programmed to project a graphic using the graphics projector based at least in part on the projector brightness offset value.

18 Claims, 6 Drawing Sheets

CONTROLLING GRAPHICS PROJECTOR BRIGHTNESS

INTRODUCTION

The present disclosure relates to systems and methods for displaying graphics in a vehicle, and more particularly, systems and methods for controlling a brightness of a graphics projector for a vehicle.

To increase occupant awareness and convenience, vehicles may be equipped with display systems which are configured to provide information about an environment surrounding the vehicle to an occupant. Display systems may use human-interface devices, such as, for example, touchscreens, to provide information to the occupant. Display systems may also use head-up displays (HUD) to provide information to the occupant. To control and/or illuminate the HUD, a graphics projector may be used to project graphics upon a surface (e.g., a windscreen) of the vehicle. However, environmental conditions such as, for example, ambient light levels may affect a perceived brightness of projections for vehicle occupants. Additionally, characteristics of projected graphics such as, for example, a size of the projected graphics may affect the perceived brightness of projections for vehicle occupants.

Thus, while current graphics projector and HUD systems for vehicles achieve their intended purpose, there is a need for a new and improved system and method for controlling a brightness of a graphics projector for a vehicle.

SUMMARY

According to several aspects, a system for controlling a brightness of a graphics projector for a vehicle is provided. The system includes a vehicle sensor, the graphics projector including at least one light source module, and a controller in electrical communication with the vehicle sensor and the graphics projector. The controller is programmed to determine an ambient light level using the vehicle sensor. The controller is further programmed to determine a projector brightness offset value based at least in part on the ambient light level. The controller is further programmed to project a graphic using the graphics projector based at least in part on the projector brightness offset value.

In another aspect of the present disclosure, the vehicle sensor is an ambient light sensor configured to measure the ambient light level.

In another aspect of the present disclosure, to determine the projector brightness offset value, the controller is further programmed to determine a first brightness offset value based on the ambient light level. To determine the projector brightness offset value, the controller is further programmed to determine a second brightness offset value based on a projection area of the graphic. To determine the projector brightness offset value, the controller is further programmed to determine the projector brightness offset value to be a sum of the first brightness offset value and the second brightness offset value.

In another aspect of the present disclosure, to determine the second brightness offset value, the controller is further programmed to determine the projection area of the graphic based at least in part on a height of the graphic and a width of the graphic. To determine the second brightness offset value, the controller is further programmed to determine the second brightness offset value based on the projection area of the graphic.

In another aspect of the present disclosure, the at least one light source module further may include a light-emitting diode (LED) array configured to produce a first source light and an optical filter in optical communication with the LED array. The optical filter is configured to receive the first source light and transmit a filtered light. The at least one light source module further may include a focusing lens in optical communication with the optical filter. The focusing lens is configured to receive the filtered light and transmit a narrow-beam light.

In another aspect of the present disclosure, the graphics projector further may include an optical collimator in optical communication with the at least one light source module. The optical collimator is configured to receive the narrow-beam light and transmit a collimated light. The graphics projector further may include an optoelectrical mirror in optical communication with the optical collimator. The optoelectrical mirror is in electrical communication with the controller. The optoelectrical mirror is configured to direct the collimated light.

In another aspect of the present disclosure, the at least one light source module further includes a plurality of light source modules in optical communication with the optical collimator. The system further may include an optical waveguide in optical communication with the plurality of light source modules and the optical collimator. The optical waveguide is configured to transmit the narrow-beam light from each of the plurality of light source modules to the optical collimator.

In another aspect of the present disclosure, one of the plurality of light source modules is configured to produce narrow-beam light having a wavelength of 380 nanometers. One other of the plurality of light source modules is configured to produce narrow-beam light having a wavelength of 405 nanometers. One other of the plurality of light source modules is configured to produce narrow-beam light having a wavelength of 460 nanometers.

In another aspect of the present disclosure, to project the graphic, the controller is further programmed to determine a total projector brightness value. The total projector brightness value is a sum of the projector brightness offset value and a projector brightness default value. To project the graphic, the controller is further programmed to determine a subset of a plurality of LEDs of the LED array of each of the plurality of light source modules to illuminate based at least in part on the total projector brightness value. To project the graphic, the controller is further programmed to illuminate the subset of the plurality of LEDs. To project the graphic, the controller is further programmed to project the graphic by directing the optoelectrical mirror.

In another aspect of the present disclosure, the light source module further may include an optical manifold light source. The optical manifold light source includes a plurality of LEDs, an LED combiner in optical communication with the plurality of LEDs, a free-form lens in optical communication with the LED combiner, and a free-form mirror in optical communication with the free-form lens.

According to several aspects, a method for controlling a brightness of a graphics projector for a vehicle is provided. The method includes determining an ambient light level using an ambient light sensor. The method also includes determining a projector brightness offset value based at least in part on the ambient light level. The method also includes projecting a graphic using the graphics projector based at least in part on the projector brightness offset value.

In another aspect of the present disclosure, determining the projector brightness offset value further may include determining a first brightness offset value based on the ambient light level. Determining the projector brightness offset value further may include determining a second brightness offset value based on a projection area of the graphic. Determining the projector brightness offset value further may include determining the projector brightness offset value to be a sum of the first brightness offset value and the second brightness offset value.

In another aspect of the present disclosure, determining the second brightness offset value further may include determining the projection area of the graphic based at least in part on a height of the graphic and a width of the graphic. Determining the second brightness offset value further may include determining the second brightness offset value based on the projection area of the graphic.

In another aspect of the present disclosure, projecting the graphic further may include the graphics projector further including at least one light source module. The at least one light source module includes a light-emitting diode (LED) array configured to produce a first source light and an optical filter in optical communication with the LED array. The optical filter is configured to receive the first source light and transmit a filtered light. The at least one light source module further includes a focusing lens in optical communication with the optical filter. The focusing lens is configured to receive the filtered light and transmit a narrow-beam light.

In another aspect of the present disclosure, projecting the graphic further may include the graphics projector further including an optical collimator in optical communication with the light source module. The optical collimator is configured to receive the narrow-beam light and transmit a collimated light. The graphics projector further includes an optoelectrical mirror in optical communication with the optical collimator. The optoelectrical mirror is in electrical communication with the controller. The optoelectrical mirror is configured to direct the collimated light.

In another aspect of the present disclosure, the at least one light source module further includes a plurality of light source modules in optical communication with the optical collimator. Projecting the graphic further may include the graphics projector further including an optical waveguide in optical communication with the plurality of light source modules and the optical collimator. The optical waveguide is configured to transmit the narrow-beam light from each of the plurality of light source modules to the optical collimator.

In another aspect of the present disclosure, projecting the graphic further may include determining a total projector brightness value. The total projector brightness value is a sum of the projector brightness offset value and a projector brightness default value. Projecting the graphic further may include determining a subset of a plurality of LEDs of the LED array of each of the plurality of light source modules to illuminate based at least in part on the total projector brightness value. Projecting the graphic further may include illuminating the subset of the plurality of LEDs. Projecting the graphic further may include projecting the graphic by directing the optoelectrical mirror.

According to several aspects, a system for controlling a brightness of a graphics projector for a vehicle is provided. The system includes an ambient light sensor and a graphics projector including a plurality of light source modules. Each of the plurality of light source modules further may include a light-emitting diode (LED) array configured to produce a first source light and an optical filter in optical communication with the LED array. The optical filter is configured to receive the first source light and transmit a filtered light. Each of the plurality of light source modules further may include a focusing lens in optical communication with the optical filter. The focusing lens is configured to receive the filtered light and transmit a narrow-beam light. The graphics projector also includes an optical collimator in optical communication with the plurality of light source modules. The optical collimator is configured to receive the narrow-beam light and transmit a collimated light. The graphics projector also includes an optoelectrical mirror in optical communication with the optical collimator. The optoelectrical mirror is in electrical communication with the controller. The optoelectrical mirror is configured to direct the collimated light. The graphics projector also includes an optical waveguide in optical communication with the plurality of light source modules and the optical collimator. The optical waveguide is configured to transmit the narrow-beam light from each of the plurality of light source modules to the optical collimator. The system also includes a controller in electrical communication with the ambient light sensor and the graphics projector. The controller is programmed to determine an ambient light level using the ambient light sensor, determine a projector brightness offset value based at least in part on the ambient light level, and project a graphic using the graphics projector based at least in part on the projector brightness offset value.

In another aspect of the present disclosure, to determine the projector brightness offset value, the controller is further programmed to determine a first brightness offset value based on the ambient light level. To determine the projector brightness offset value, the controller is further programmed to determine a projection area of the graphic based at least in part on a height of the graphic and a width of the graphic. To determine the projector brightness offset value, the controller is further programmed to determine a second brightness offset value based on the projection area of the graphic. To determine the projector brightness offset value, the controller is further programmed to determine the projector brightness offset value to be a sum of the first brightness offset value and the second brightness offset value.

In another aspect of the present disclosure, to project the graphic, the controller is further programmed to determine a total projector brightness value. The total projector brightness value is a sum of the projector brightness offset value and a projector brightness default value. To project the graphic, the controller is further programmed to determine a subset of a plurality of LEDs of the LED array of each of the plurality of light source modules to illuminate based at least in part on the total projector brightness value. To project the graphic, the controller is further programmed to illuminate the subset of the plurality of LEDs. To project the graphic, the controller is further programmed to project the graphic by directing the optoelectrical mirror.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Due to environmental factors such as, for example, ambient light level, perceived brightness of projection systems such as, for example, transparent windscreen display (TWD) systems may vary. For example, in situations of high ambient light level (e.g., during high sun load conditions), perceived brightness of projected graphics may appear dimmer than desired. In situations of low ambient light level (e.g., during night driving), perceived brightness of projected graphics may appear brighter than desired. Additionally, characteristics of displayed graphics, such as, for example, projection area, may also influence perceived brightness levels. For example, large graphics may appear dimmer at a given projector radiant power output level, because the radiant energy is distributed across a larger area. Therefore, the present disclosure provides a new and improved system and method for controlling a brightness of a graphics projector for a vehicle, including compensation for variation in ambient light levels and projection area.

Figure 1:
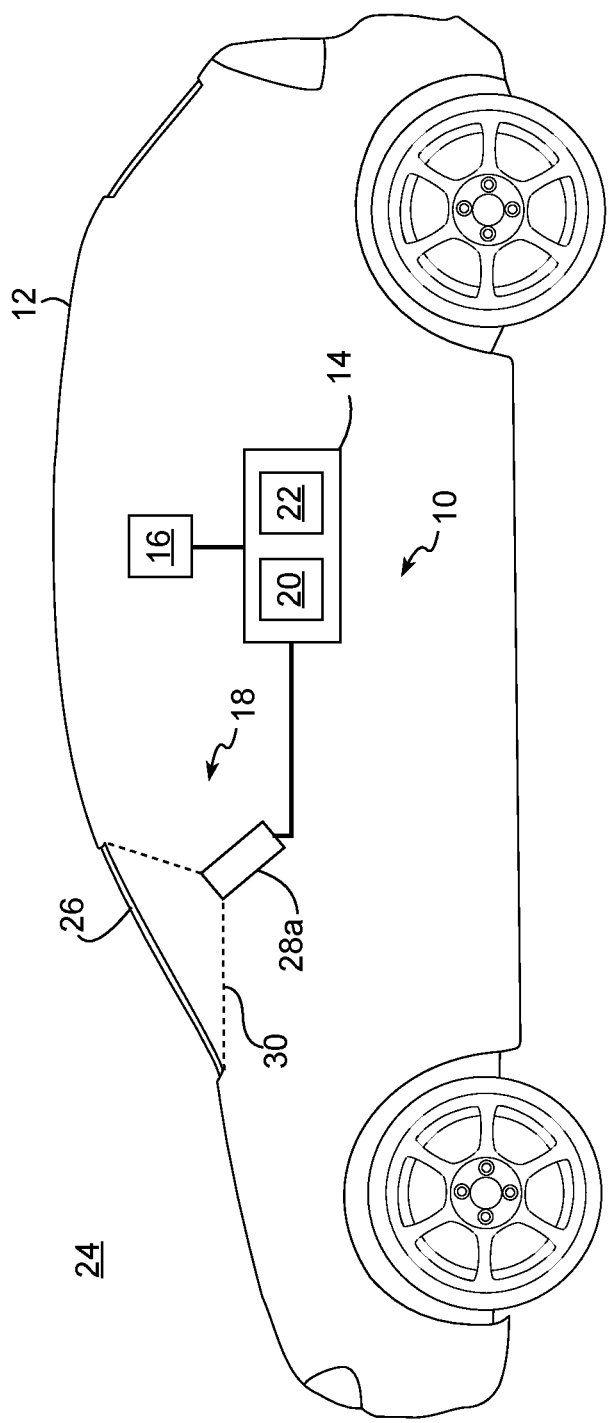
FIG. 1 is a schematic diagram of a system for controlling a brightness of a graphics projector for a vehicle, according to an exemplary embodiment.

Referring to FIG. 1, a system for controlling a brightness of a graphics projector for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a plurality of vehicle sensors 16, and a transparent windscreen display (TWD) system 18.

The controller 14 is used to control the TWD system 18 and perform a method 100 for controlling a brightness of a graphics projector for a vehicle, as will be discussed in greater detail below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16 and the TWD system 18. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 is used to determine information about an environment 24 surrounding the vehicle 12. In an exemplary embodiment, the plurality of vehicle sensors 16 includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of vehicle sensors further includes sensors to determine information about the environment 24 surrounding the vehicle 12, for example, an ambient light sensor (i.e., a phototransistor, photodiode, photonic integrated circuit, or the like), an ambient air temperature sensor, a barometric pressure sensor, and/or a photo and/or video camera which is positioned to view the environment 24 in front of the vehicle 12. In another exemplary embodiment, at least one of the plurality of vehicle sensors 16 is capable of measuring distances in the environment 24 surrounding the vehicle 12. In a non-limiting example wherein the plurality of vehicle sensors 16 includes a camera, the plurality of vehicle sensors 16 measures distances using an image processing algorithm configured to process images from the camera and determine distances between objects. In another non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen 26 of the vehicle 12. In another example, at least one of the plurality of vehicle sensors 16 is affixed outside of the vehicle 12, for example, on a roof of the vehicle 12, having a view of the environment 24 surrounding the vehicle 12. It should be understood that various additional types of vehicle sensors, such as, for example, LiDAR sensors, ultrasonic ranging sensors, radar sensors, and/or time-of-flight sensors are within the scope of the present disclosure.

The TWD system 18 is a type of head-up display (HUD) system used to display graphics on the windscreen 26 of the vehicle 12. The TWD system 18 can display TWD graphics (not shown) in any region of the windscreen 26. In an exemplary embodiment, the TWD system 18 includes transparent phosphors (not shown) embedded into the windscreen 26 and a first embodiment of a graphics projector 28a. In another exemplary embodiment, the TWD system 18 includes a second embodiment of the graphics projector 28b instead of the first embodiment of the graphics projector 28a. In another exemplary embodiment, the TWD system 18 includes a third embodiment of the graphics projector 28c instead of the first embodiment of the graphics projector 28a or the second embodiment of the graphics projector 28b. The first embodiment of the graphics projector 28a, the second embodiment of the graphics projector 28b, and the third embodiment of the graphics projector 28c will be discussed in greater detail below. The TWD system 18 is in electrical communication with the controller 14 as discussed above.

The transparent phosphors are light emitting particles which fluoresce in response to being excited by the first embodiment of the graphics projector 28a, the second embodiment of the graphics projector 28b, or the third embodiment of the graphics projector 28c. In an exemplary embodiment, the transparent phosphors are red, green, and blue (RGB) phosphors, allowing full color operation of the TWD system 18. The use of monochrome and/or two-color phosphors is also within the scope of the present disclosure. When excitation light is absorbed by the transparent phosphors, visible light is emitted by the transparent phosphors. The excitation light is provided by the first embodiment of the graphics projector 28a, the second embodiment of the graphics projector 28b, or the third embodiment of the graphics projector 28c.

The first embodiment of the graphics projector 28a, the second embodiment of the graphics projector 28b, or the third embodiment of the graphics projector 28c is used to excite the transparent phosphors in a predetermined pattern to produce the TWD graphics on the windscreen 26. In an exemplary embodiment, the first embodiment of the graphics projector 28a, the second embodiment of the graphics projector 28b, or the third embodiment of the graphics projector 28c is disposed proximally to the headliner of the vehicle 12. In a non-limiting example, a 380 nanometer light of a projected light 30 excites red transparent phosphors. A 405 nanometer light of the projected light 30 excites blue transparent phosphors. A 460 nanometer light of the projected light 30 excites green transparent phosphors. It should be understood that in some embodiments, the transparent phosphors may be excited by other wavelengths of excitation light. The first embodiment of the graphics projector 28a, the second embodiment of the graphics projector 28b, or the third embodiment of the graphics projector 28c may be configured to produce any wavelengths of excitation light required to excite the transparent phosphors.

In an exemplary embodiment, the controller 14 uses the TWD system 18 to display graphics indicating conditions of the vehicle 12 and/or the environment 24 surrounding the vehicle 12 detected by the plurality of vehicle sensors 16. In a non-limiting example, the TWD system 18 is used as a primary instrument to display information such as, for example, vehicle speed, coolant temperature, fuel level, state of charge, and/or the like. In another non-limiting example, the controller 14 uses the TWD system 18 to highlight an object of interest in the environment 24 surrounding the vehicle 12, for example, a hazardous object in a path of the vehicle 12. Using the plurality of vehicle sensors 16, the controller 14 identifies an object of interest and determines a position of the object of interest relative to the vehicle 12. Subsequently, the controller 14 uses the TWD system 18 to display a graphic which appears, from a perspective of a vehicle occupant, to be overlayed on the object of interest based at least on the position of the object of interest relative to the vehicle 12. Use of the TWD system 18 to display graphics is discussed in greater detail in U.S. application Ser. No. 17/749,464 titled "HYBRID AUGMENTED REALITY HEAD-UP DISPLAY FOR CREATING AN EDGE-TO-EDGE AUGMENTED REALITY VIEW" filed on May 20, 2022, the entire contents of which is hereby incorporated by reference.

It should be understood that the system 10 is merely exemplary in nature, and that the first embodiment of the graphics projector 28a, the second embodiment of the graphics projector 28b, and the third embodiment of the graphics projector 28c may be used in other devices (e.g., a video projector), in other vehicles (e.g., seafaring vehicles, airborne vehicles, and the like), and/or in other systems without departing from the scope of the present disclosure.

Figure 2:
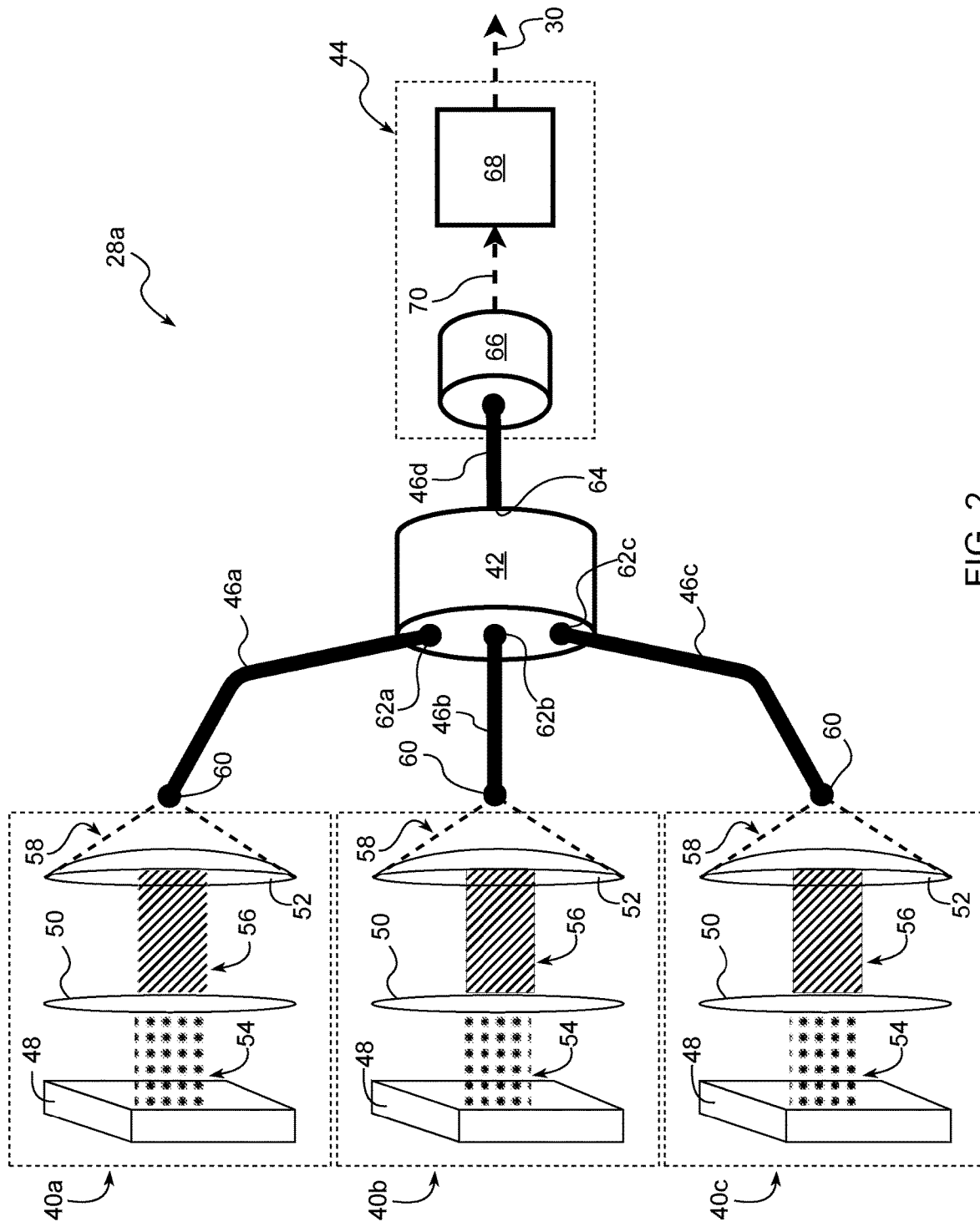
FIG. 2 is a schematic diagram of a first embodiment of a graphics projector for use in a vehicle, according to an exemplary embodiment.

Referring to FIG. 2, a schematic diagram of the first embodiment of a graphics projector for use in a vehicle is illustrated and generally indicated by reference number 28a. The first embodiment of the graphics projector 28a generally includes a first light source module 40a, a second light source module 40b, a third light source module 40c, a fiber-optic coupler 42, and an output module 44.

The components of the first embodiment of the graphics projector 28a (i.e., the first light source module 40a, the second light source module 40b, the third light source module 40c, the fiber-optic coupler 42, and the output module 44) are in optical communication with each other. In the scope of the present disclosure, optical communication means that light can propagate through the space between the components and interact with the optical properties of each component. Optical communication may be facilitated by positioning the first light source module 40a, the second light source module 40b, the third light source module 40c, the fiber-optic coupler 42, and the output module 44 such that light is transmitted between the components due to the intrinsic reflection and/or refraction characteristics of the components and/or characteristics of a medium between the components (e.g., air). Optical communication may also be facilitated by use of an optical waveguide. In the scope of the present disclosure, an optical waveguide is a physical structure that is designed to confine and guide light along a specified path (i.e., between components in the first embodiment of the graphics projector 28a). In a non-limiting example, a plurality of fiber-optic cables 46a, 46b, 46c, 46d are used to establish optical communication. In an exemplary embodiment, the fiber-optic cables 46a, 46b, 46c, 46d are optoelectrical cables which transmit light, acting as optical waveguides. In a non-limiting example, the fiber-optic cables 46a, 46b, 46c, 46d contain multiple strands of glass or plastic fibers. The fibers are bundled together and surrounded by a protective coating. The first fiber-optic cable 46a is used to establish optical communication between the first light source module 40a and the fiber-optic coupler 42. The second fiber-optic cable 46b is used to establish optical communication between the second light source module 40b and the fiber-optic coupler 42. The third fiber-optic cable 46c is used to establish optical communication between the third light source module 40c and the fiber-optic coupler 42. The fourth fiber-optic cable 46d is used to establish optical communication between the fiber-optic coupler 42 and the output module 44. It should further be understood that various additional methods for establishing optical communication between optical components, including, for example, planar waveguides, rib waveguides, channel waveguides, hollow core waveguides, and the like are within the scope of the present disclosure.

The first light source module 40a is used to produce light for the first embodiment of the graphics projector 28a as will be discussed in greater detail below. The first light source module 40a includes a light-emitting diode (LED) array 48, an optical filter 50, and a focusing lens 52.

The LED array 48 is used to provide a light source for the first light source module 40a. In an exemplary embodiment, the LED array 48 includes a plurality of array light-emitting diodes (LEDs) electrically connected in a series or parallel configuration (not shown). The LED array 48 further includes at least two electrical terminals (not shown) electrically connected to the plurality of array LEDs. In another exemplary embodiment, the plurality of array LEDs of the LED array 48 may be individually controlled by the controller 14. In a non-limiting example, the plurality of array LEDs of the LED array 48 are individually addressable LEDs which may be controlled using digital signals from the controller 14. In another non-limiting example, the plurality of array LEDs of the LED array 48 are directly controlled by the controller 14 (e.g., using multiplexing). The plurality of array LEDs are arranged such as to achieve a high density of LEDs in a relatively small area. In a non-limiting example, the plurality of array LEDs are arranged in a grid pattern. In another non-limiting example, the plurality of array LEDs are arranged in a radial pattern. The plurality of array LEDs are mechanically affixed to a substrate to provide structural stability to the arrangement of the plurality of array LEDs. In a non-limiting example, the substrate is a printed circuit board (PCB). In another non-limiting example, the substrate is a metal-core printed circuit board (MCPCB) including a metal layer which contributes to thermal management of the plurality of array LEDs by dissipating heat.

When an electrical current is passed through the plurality of array LEDs using the electrical terminals, the plurality of array LEDs emit light. The light emitted by the plurality of array LEDs of the LED array 48 is referred to as a first source light 54. In an exemplary embodiment, the first source light 54 is polychromatic, meaning that the first source light 54 contains multiple wavelengths of light (e.g., light having wavelengths between 380 nanometers and 460 nanometers). In another exemplary embodiment, the first source light 54 is monochromatic, meaning that the first source light 54 contains only a single wavelength of light (e.g., 380 nanometers, 405 nanometers, or 460 nanometers). It should be understood that the aforementioned wavelengths and wavelength ranges are merely exemplary in nature. The LED array 48 is configured such that the first source light 54 is incident upon the optical filter 50.

The optical filter 50 is used to filter the first source light 54. In an exemplary embodiment, the optical filter 50 is configured to receive the first source light 54 and transmit a filtered light 56. In the scope of the present disclosure, the filtered light 56 is light having only wavelengths within a passband of the optical filter 50. In a non-limiting example, the optical filter 50 includes a substrate material (e.g., glass or quartz), onto which one or more layers of thin film are deposited. The thin film layers are designed to either absorb or refract specific wavelengths of light. In a first exemplary embodiment, the optical filter 50 is an interference optical bandpass filter. In a non-limiting example, the interference optical bandpass filter includes alternating dielectric layers of materials with different refractive indices. The alternating layers are configured to create an interference pattern that enhances the transmission of wavelengths within the passband and suppresses other wavelengths (analogous to a Fabry-Pérot interferometer).

In a second exemplary embodiment, the optical filter 50 is an absorptive optical bandpass filter. In a non-limiting example, the absorptive optical bandpass filter includes one or more layers of an absorbing dielectric material deposited on the substrate. The absorbing layers dissipate the unwanted wavelengths through absorption, while the wavelengths within the passband are transmitted. In exemplary embodiment, the passband of the optical filter 50 includes only monochromatic light having a single wavelength (e.g., 380 nanometers, 405 nanometers, 460 nanometers). Therefore, the filtered light 56 contains only light having a single wavelength. It should be understood that the aforementioned wavelengths are merely exemplary in nature, and that the passband of the optical filter 50 may include other wavelengths without departing from the scope of the present disclosure. The optical filter 50 is configured such that the filtered light 56 is incident upon the focusing lens 52.

The focusing lens 52 is used to concentrate the filtered light 56 to produce a narrow-beam light 58. In an exemplary embodiment, the focusing lens 52 includes a curved transparent substrate (e.g., glass or other transparent material). When the filtered light 56 passes through the focusing lens 52, the curvature of the focusing lens 52 causes the filtered light 56 to refract towards a focal point 60. The position of the focal point 60 is determined by the curvature and refractive index of the focusing lens 52. The focal point 60 of the focusing lens 52 is a termination of the first fiber-optic cable 46a, such that the narrow-beam light 58 is transmitted from the focusing lens 52 to the fiber-optic coupler 42 via the first fiber-optic cable 46a.

It should be understood that the second light source module 40b and the third light source module 40c each include the same components as the first light source module 40a (i.e., the LED array 48, the optical filter 50, and the focusing lens 52). Therefore, the description provided above for the first light source module 40a also applies to the second light source module 40b and the third light source module 40c. In an exemplary embodiment, each of the first light source module 40a, the second light source module 40b, and the third light source module 40c is configured to produce narrow-beam light 58 having a different wavelength. In a non-limiting example, the first light source module 40a produces narrow-beam light 58 having a wavelength of 380 nanometers. The second light source module 40b produces narrow-beam light 58 having a wavelength of 405 nanometers. The third light source module 40c produces narrow-beam light 58 having a wavelength of 460 nanometers. It should be understood that the first light source module 40a, the second light source module 40b, and the third light source module 40c may be configured to produce narrow-beam light 58 having different wavelengths without departing from the scope of the present disclosure. It should also be understood that the first embodiment of the graphics projector 28a may include more or less than three light source modules without departing from the scope of the present disclosure.

The fiber-optic coupler 42 is used to combine the narrow-beam light 58 from each of the first light source module 40a, the second light source module 40b, and the third light source module 40c. In an exemplary embodiment, the fiber-optic coupler 42 includes a first input port 62a in optical communication with the first light source module 40a via the first fiber-optic cable 46a, a second input port 62b in optical communication with the second light source module 40b via the second fiber-optic cable 46b, and a third input port 62c in optical communication with the third light source module 40c via the third fiber-optic cable 46c. The fiber-optic coupler 42 further includes an output port 64. Each of the input ports 62a, 62b, 62c and output port 64 includes an optical fiber (not shown) which is aligned and fused with the optical fibers of the other ports. When light is introduced into one of the input ports 62a, 62b, 62c, the light propagates along the optical fiber and is transferred to the output port 64. Therefore, the intensity of the narrow-beam light 58 from each of the first light source module 40a, the second light source module 40b, and the third light source module 40c is summed at the output port 64 of the fiber-optic coupler 42. The output port 64 is in optical communication with the output module 44 via the fourth fiber-optic cable 46d.

The output module 44 is used to direct the narrow-beam light 58 from the output port of the fiber-optic coupler 42 in order to project graphics. The output module 44 includes an optical collimator 66 and an optoelectrical mirror 68. It should be understood that the output module 44 may include additional electrical and/or optical components, such as, for example, lenses, filters, controllers, and the like, without departing from the scope of the present disclosure.

The optical collimator 66 is used to produce a collimated light 70 from the narrow-beam light 58. In an exemplary embodiment, the optical collimator 66 includes a collimating lens, which is used to focus the narrow-beam light 58 into a parallel (i.e., collimated) beam. In a non-limiting example, the collimating lens is a plano-convex or double-convex lens which is configured to produce a desired beam divergence and collimation distance. The optical collimator 66 works by refracting the narrow-beam light 58 from the fiber-optic coupler 42 using the collimating lens to produce the collimated light 70. The optical collimator 66 is in optical communication with the optoelectrical mirror 68.

The apparatus including the first light source module 40a, the second light source module 40b, the third light source module 40c, and the optical collimator 66 is also referred to as a projector light source and may be used as a source of collimated light for various types and configurations of projector systems without departing from the scope of the present disclosure.

The optoelectrical mirror 68 is used to direct the collimated light 70 based on electrical signals. In the scope of the present disclosure, the optoelectrical mirror 68 is an electromechanical device (e.g., a microelectromechanical system) configured to direct light with high precision, accuracy, and speed in response to electrical signals. In an exemplary embodiment, the optoelectrical mirror 68 includes a digital micromirror device (DMD). The DMD is an optical microelectromechanical system that contains an array of mirrors which can be individually tilted to reflect light in a desired direction. In a non-limiting example, the DMD is used to create high-resolution images by reflecting the collimated light 70 onto a projection surface. The tilting mirrors on the DMD are controlled by an electronic driver, which rapidly modulates the mirrors to project a graphic onto a projection surface. Embodiments wherein the optoelectrical mirror 68 includes the DMD may be referred to as digital light processing (DLP) graphics projectors.

In another exemplary embodiment, the optoelectrical mirror 68 is a microelectromechanical scanning mirror. In an exemplary embodiment, the microelectromechanical scanning mirror is an optoelectrical device which utilizes at least one mirror to create high-resolution images. The at least one mirror may be tilted to reflect the collimated light 70 in a desired direction. The tilting action of the at least one mirror is controlled by an electronic driver, which rapidly modulates the mirrors to project a graphic onto the projection surface.

In yet another exemplary embodiment, the optoelectrical mirror 68 is a galvanometer mirror. In an exemplary embodiment, the galvanometer mirror is an optoelectrical device which utilizes at least one mirror which rotates on an axis to redirect the collimated light 70. The at least one mirror of the galvanometer mirror is controlled by a galvanometer, which is an electric motor which converts electrical current signals into mechanical movement. The galvanometer rapidly rotates the at least one mirror on the axis, allowing the collimated light 70 to be redirected to scan the collimated light 70 across a projection surface and display a graphic. The light transmitted by the optoelectrical mirror 68 to the projection surface is referred to as a projected light 30.

It should be understood that in order to adjust a total light intensity of the projected light 30, the first embodiment of the graphics projector 28a may include more or less than three light source modules without departing from the scope of the present disclosure.

Figure 3:
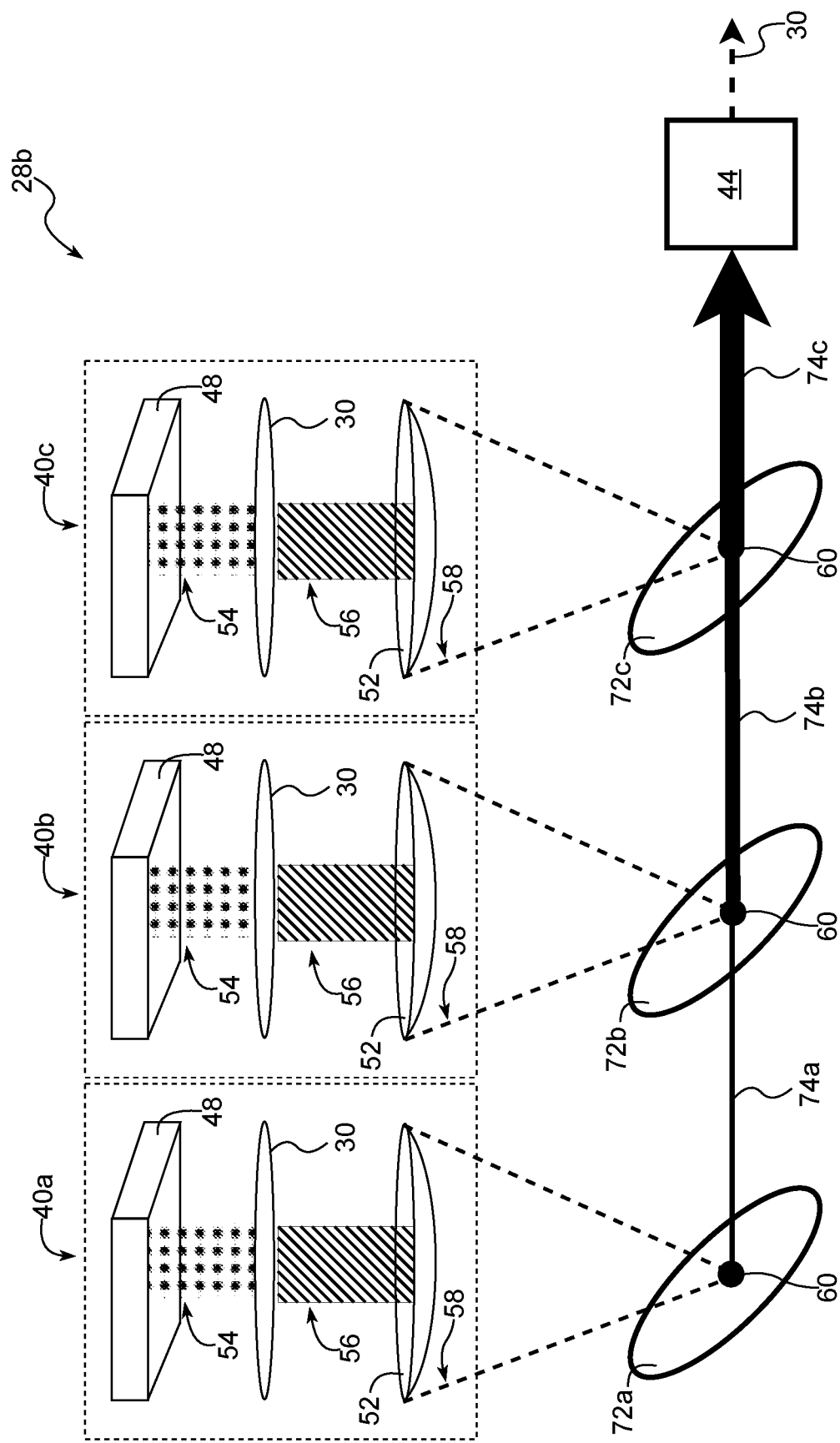
FIG. 3 is a schematic diagram of a second embodiment of the graphics projector for use in a vehicle, according to an exemplary embodiment.

Referring to FIG. 3, a schematic diagram of the second embodiment of the graphics projector for use in a vehicle is illustrated and generally indicated by reference number 28b. The second embodiment of the graphics projector 28b generally includes the first light source module 40a, the second light source module 40b, the third light source module 40c, a first dichroic mirror 72a, a second dichroic mirror 72b, a third dichroic mirror 72c, and the output module 44. The description of the first light source module 40a, the second light source module 40b, the third light source module 40c, and the output module 44 given above in reference to FIG. 2 and the first embodiment of the graphics projector 28a also applies to the corresponding elements in the second embodiment of the graphics projector 28b. Instead of the fiber-optic cables 46a, 46b, 46c, 46d and the fiber-optic coupler 42, the second embodiment of the graphics projector 28b utilizes the first dichroic mirror 72a, the second dichroic mirror 72b, and the third dichroic mirror 72c to combine the narrow-beam light 58 from each of the first light source module 40a, the second light source module 40b, and the third light source module 40c.

In the scope of the present disclosure, a dichroic mirror is a mirror which reflects light of a predetermined wavelength and transmits light of other wavelengths. In an exemplary embodiment, the first dichroic mirror 72a, the second dichroic mirror 72b, and the third dichroic mirror 72c include a substrate material (e.g., glass, quartz) coated in a plurality of dielectric layers. Each of the plurality of dielectric layers is selected to have a particular index of refraction and thickness such that the first dichroic mirror 72a, the second dichroic mirror 72b, and the third dichroic mirror 72c reflect light of particular wavelengths and transmit light of other wavelengths.

In a non-limiting example, the first light source module 40a produces narrow-beam light 58 having a wavelength of 380 nanometers. The second light source module 40b produces narrow-beam light 58 having a wavelength of 405 nanometers. The third light source module 40c produces narrow-beam light 58 having a wavelength of 460 nanometers. Accordingly, the first dichroic mirror 72a is configured to reflect narrow-beam light 58 having a wavelength of 380 nanometers and transmit all other wavelengths of light. The second dichroic mirror 72b is configured to reflect narrow-beam light 58 having a wavelength of 405 nanometers and transmit all other wavelengths of light. The third dichroic mirror 72c is configured to reflect narrow-beam light 58 having a wavelength of 460 nanometers and transmit all other wavelengths of light. It should be understood that the aforementioned wavelengths are merely exemplary in nature.

The first dichroic mirror 72a is positioned such that narrow-beam light 58 from the first light source module 40a reflected by the first dichroic mirror 72a is incident upon the second dichroic mirror 72b. The second dichroic mirror 72b is positioned such that narrow-beam light 58 from the second light source module 40b reflected by the second dichroic mirror 72b is incident upon the third dichroic mirror 72c. The third dichroic mirror 72c is positioned such that narrow-beam light 58 from the third light source module 40c reflected by the third dichroic mirror 72c is incident upon the output module 44. In an exemplary embodiment, each of the first dichroic mirror 72a, the second dichroic mirror 72b, and the third dichroic mirror 72c are positioned at a 45-degree angle to an angle of incidence of the narrow-beam light 58 and aligned along a center axis, as depicted in FIG. 3.

Therefore, the narrow-beam light 58 with a wavelength of 380 nanometers from the first light source module 40a is reflected by the first dichroic mirror 26a and incident upon the second dichroic mirror 72b, as indicated by a first line 74a. The narrow-beam light 58 with a wavelength of 380 nanometers from the first light source module 40a is transmitted by the second dichroic mirror 72b and is incident upon the third dichroic mirror 72c. The narrow-beam light 58 with a wavelength of 405 nanometers from the second light source module 40b is reflected by the second dichroic mirror 72b and is incident upon the third dichroic mirror 72c. Therefore, both the narrow-beam light 58 with a wavelength of 380 nanometers from the first light source module 40a and the narrow-beam light 58 with a wavelength of 405 nanometers from the second light source module 40b are incident upon the third dichroic mirror 72c as indicated by a second line 74b. The narrow-beam light 58 with a wavelength of 380 nanometers from the first light source module 40a and the narrow-beam light 58 with a wavelength of 405 nanometers from the second light source module 40b are transmitted by the third dichroic mirror 72c and are incident upon the output module 44. The narrow-beam light 58 with a wavelength of 460 nanometers from the third light source module 40c is reflected by the third dichroic mirror 72c and is incident upon the output module 44. Therefore, the narrow-beam light 58 with a wavelength of 380 nanometers from the first light source module 40a, the narrow-beam light 58 with a wavelength of 405 nanometers from the second light source module 40b, and the narrow-beam light 58 with a wavelength of 460 nanometers from the third light source module 40c are incident upon the output module 44 as indicated by a third line 74c.

The total narrow-beam light (i.e., the narrow-beam light 58 with a wavelength of 380 nanometers from the first light source module 40a, the narrow-beam light 58 with a wavelength of 405 nanometers from the second light source module 40b, and the narrow-beam light 58 with a wavelength of 460 nanometers from the third light source module 40c) incident upon the output module 44 is collimated by the optical collimator 66 and directed by the optoelectrical mirror 68 as discussed above.

Figure 4:
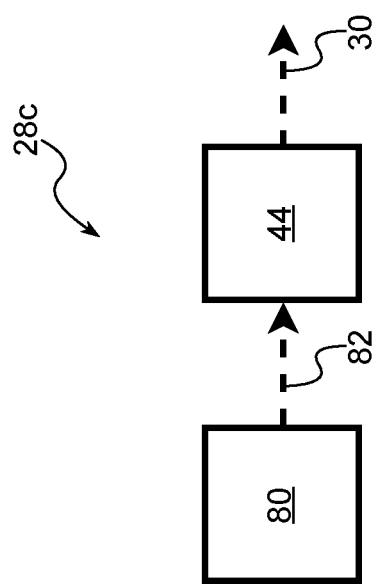
FIG. 4 is a schematic diagram of a third embodiment of the graphics projector for use in a vehicle, according to an exemplary embodiment.

Referring to FIG. 4, a schematic diagram of the third embodiment of the graphics projector for use in a vehicle is illustrated and generally indicated by reference number 28c. The third embodiment of the graphics projector 28c generally includes an optical manifold light source 80 and the output module 44. The optical manifold light source 80 produces a second source light 82 which is incident upon the output module 44, collimated by the optical collimator 66, and directed by the optoelectrical mirror 68 as discussed above.

Figure 5:
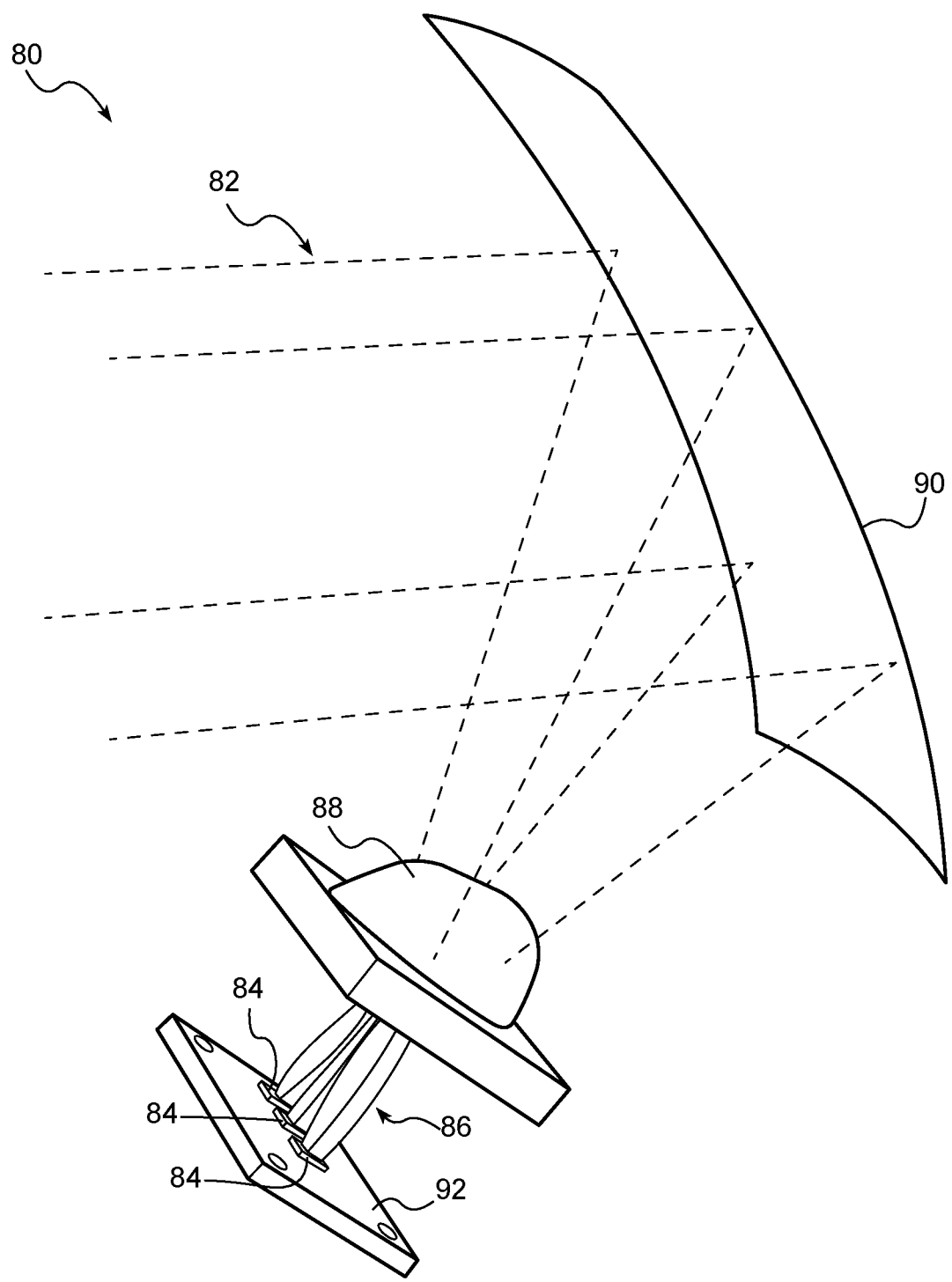
FIG. 5 is a schematic diagram of an optical manifold light source, according to an exemplary embodiment.

Referring to FIG. 5, a schematic diagram of the optical manifold light source 80 is shown. The optical manifold light source 80 is used to produce the second source light 82. The optical manifold light source 80 includes a plurality of LEDs 84, an LED combiner 86, a free-form lens 88, and a free-form mirror 90.

The plurality of LEDs 84 produces the second source light 82. In an exemplary embodiment, the plurality of LEDs 84 are mechanically affixed to a substrate to provide structural stability to the arrangement of the plurality of LEDs 84. In a non-limiting example, the substrate is a printed circuit board (PCB) 92. In another non-limiting example, the substrate is a metal-core printed circuit board (MCPCB) including a metal layer which contributes to thermal management of the plurality of LEDs 84 by dissipating heat. In an exemplary embodiment, the plurality of LEDs 84 may be individually controlled by the controller 14. In a non-limiting example, the plurality of LEDs 84 are individually addressable LEDs which may be controlled using digital signals from the controller 14. In another non-limiting example, the plurality of LEDs 84 are directly controlled by the controller 14 (e.g., using multiplexing).

The LED combiner 86 is used to mix the second source light 82 from each of the plurality of LEDs 84 together. In an exemplary embodiment, the LED combiner 86 is designed using the flow-line method. In a non-limiting example, the LED combiner 86 is formed by injection molding with ultraclean optical polymers (e.g., polycarbonate or polymethyl methacrylate). The LED combiner 86 is in optical communication with the plurality of LEDs 84. In an exemplary embodiment, the plurality of LEDs 84 are coupled to the LED combiner 86 using an optical gel, an index-matching fluid, or a UV-curable optical adhesive.

The free-form lens 88 and the free-form mirror 90 are used to transform the second source light 82 into a desired pattern for use with the third embodiment of the graphics projector 28c. In an exemplary embodiment, the free-form lens 88 and the free-form mirror 90 are designed using the simultaneous multiple surface (SMS) method. The free-form lens 88 is in optical communication with the LED combiner 86. In an exemplary embodiment, the free-form lens 88 is injection molded as one part with the LED combiner 86. In another exemplary embodiment, the free-form lens 88 is coupled to the LED combiner 86 using an optical gel, an index-matching fluid, or a UV-curable optical adhesive. The free-form mirror 90 is in optical communication with the free-form lens 88, as shown in FIG. 5.

The optical manifold light source 80 including the plurality of LEDs 84, the LED combiner 86, the free-form lens 88, and the free-form mirror 90 is described in greater detail in U.S. Pat. No. 7,286,296 titled "OPTICAL MANIFOLD FOR LIGHT-EMITTING DIODES" filed on Apr. 25, 2005, the entire contents of which is hereby incorporated by reference.

Figure 6:
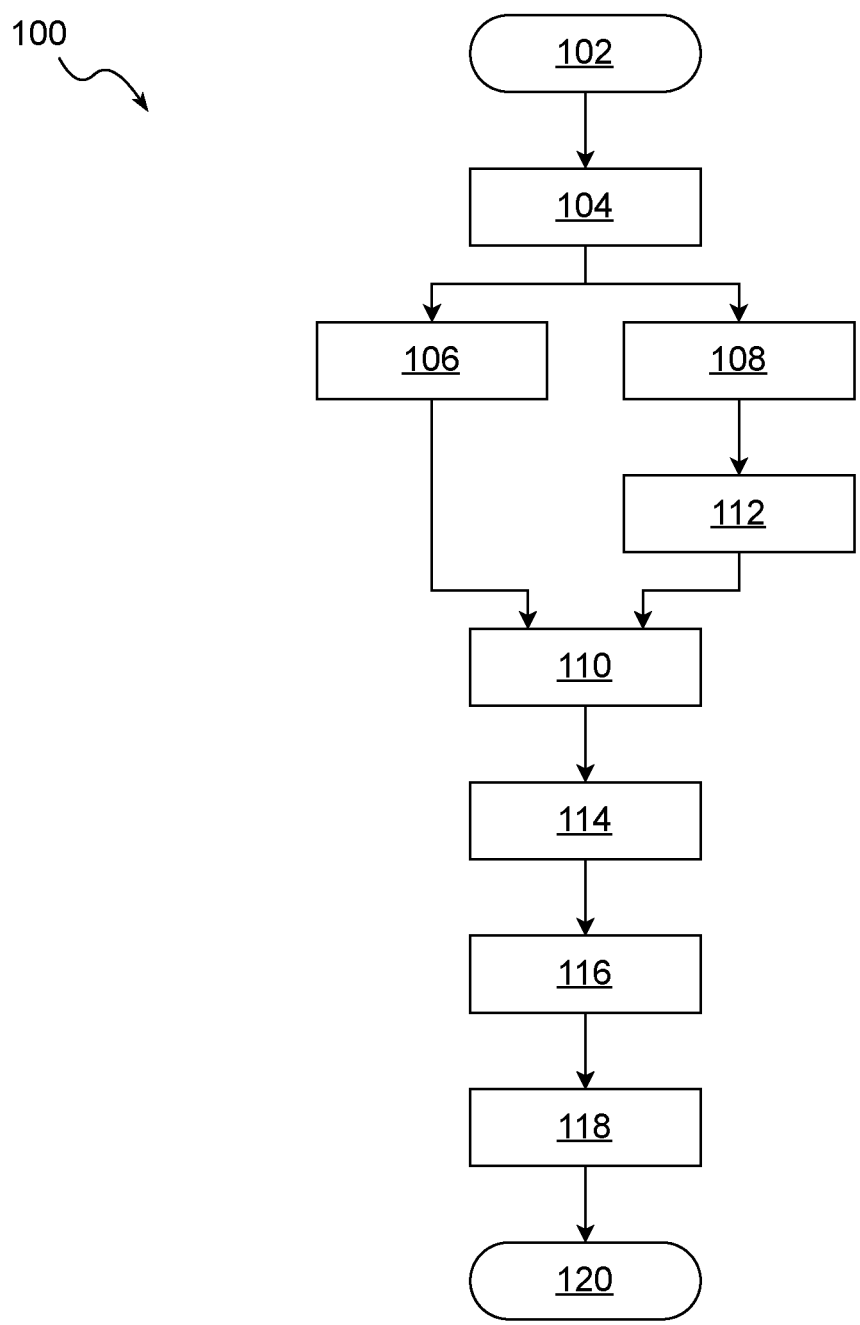
FIG. 6 is a flowchart of a method for controlling a brightness of a graphics projector for a vehicle, according to an exemplary embodiment.

Referring to FIG. 6, a flowchart of the method 100 for controlling a brightness of a graphics projector for a vehicle is provided. The method 100 begins at block 102 and proceeds to block 104. At block 104, the controller 14 determines an ambient light level using at least one of the plurality of vehicle sensors 16. In a first exemplary embodiment, the controller 14 uses the ambient light sensor of the plurality of vehicle sensors 16 to measure the ambient light level. In a non-limiting example, the ambient light sensor is located on a dashboard in an interior of the vehicle 12. In a second exemplary embodiment, the controller 14 uses the photo and/or video camera of the plurality of vehicle sensors 16 to determine the ambient light level. In a non-limiting example, the controller 14 first captures an image of the environment 24 surrounding the vehicle 12 using the photo and/or video camera. The controller 14 then analyzes the image (e.g., using a computer vision algorithm) to determine the ambient light level. In an exemplary embodiment, the ambient light level is measured in luminous flux per unit area (lux). After block 104, the method 100 proceeds to blocks 106 and 108.

At block 106, the controller 14 determines a first brightness offset value. In an exemplary embodiment, the first brightness offset value is determined based on the ambient light level determined at block 104. The first brightness offset value is used to compensate for the ambient light level, as will be discussed in greater detail below. The first brightness offset value may be greater than, less than, or equal to zero. In a non-limiting example, the first brightness offset value is a radiant flux value (i.e., an amount of radiant energy emitted per unit time) measured in watts. In a non-limiting example, the first brightness offset value is determined using a lookup table (LUT) which maps the ambient light level determined at block 104 to the first brightness offset value. The LUT has one key column (i.e., one key column for the ambient light level) and one value column (i.e., one value column for the first brightness offset value). In an exemplary embodiment, the LUT includes a plurality of rows, each of the plurality of rows mapping an ambient light level in the key column to a value in the value column (i.e., the first brightness offset value). In an exemplary embodiment, the LUT is populated such that ambient light levels above a predetermined ambient light level threshold result in first brightness offset values greater than zero and ambient light levels below the predetermined ambient light level threshold result in first brightness offset values less than zero.

The LUT is stored in the media 22 of the controller 14. In an exemplary embodiment, the plurality of rows of the LUT are predetermined. In another exemplary embodiment, the plurality of rows of the LUT may be modified by the occupant, using, for example, a human-interface device. In yet another exemplary embodiment, the plurality of rows of the LUT may be updated over-the-air (OTA) using a vehicle communication system. It should be understood that any method (e.g., programmatic data structure, logic equation, mathematical function, and/or the like) of mapping a key (i.e., the ambient light level) to a value (i.e., the first brightness offset value) is within the scope of the present disclosure. After block 106, the method 100 proceeds to block 110 as will be discussed in greater detail below.

At block 108, the controller 14 determines a projection area of a graphic to be displayed using the TWD system 18. As discussed above, the graphic displayed using the TWD system 18 may include primary instrument information and/or highlighting objects of interest. In an exemplary embodiment, the controller 14 determines a height and a width of the graphic. The projection area of the graphic is defined as the height of the graphic multiplied by the width of the graphic. In a non-limiting example, the projection area is represented in units of square meters. After block 108, the method 100 proceeds to block 112.

At block 112, the controller 14 determines a second brightness offset value. In an exemplary embodiment, the second brightness offset value is determined based on the projection area of the graphic determined at block 108. The second brightness offset value is used to compensate for the projection area of the graphic, as will be discussed in greater detail below. The second brightness offset value may be greater than, less than, or equal to zero. In a non-limiting example, the second brightness offset value is a radiant flux value (i.e., an amount of radiant energy emitted per unit time) measured in watts. In a non-limiting example, the second brightness offset value is determined using a lookup table (LUT) which maps the projection area of the graphic determined at block 108 to the second brightness offset value. The LUT has one key column (i.e., one key column for the projection area of the graphic) and one value column (i.e., one value column for the second brightness offset value). In an exemplary embodiment, the LUT includes a plurality of rows, each of the plurality of rows mapping a projection area of the graphic in the key column to a value in the value column (i.e., the second brightness offset value). In an exemplary embodiment, the LUT is populated such that projection areas above a predetermined projection area threshold result in second brightness offset values greater than zero and projection areas below the predetermined projection area threshold result in second brightness offset values less than zero.

The LUT is stored in the media 22 of the controller 14. In an exemplary embodiment, the plurality of rows of the LUT are predetermined. In another exemplary embodiment, the plurality of rows of the LUT may be modified by the occupant, using, for example, a human-interface device. In yet another exemplary embodiment, the plurality of rows of the LUT may be updated over-the-air (OTA) using the vehicle communication system. It should be understood that any method (e.g., programmatic data structure, logic equation, mathematical function, and/or the like) of mapping a key (i.e., the projection area of the graphic) to a value (i.e., the second brightness offset value) is within the scope of the present disclosure. After block 112, the method 100 proceeds to block 110.

At block 110, the controller 14 determines a total projector brightness value. To determine the total projector brightness value, the controller 14 first determines a projector brightness offset value. In an exemplary embodiment, the projector brightness offset value is a sum of the first brightness offset value determined at block 106 and the second brightness offset value determined at block 112. The controller 14 then determines a projector brightness default value. In the scope of the present disclosure, the projector brightness default value is a radiant flux value (i.e., an amount of radiant energy emitted per unit time) which is emitted by the first embodiment of the graphics projector 28a, second embodiment of the graphics projector 28b, or third embodiment of the graphics projector 28c of the TWD system 18 under default conditions (i.e., with no correction or offset for ambient light level or projection area). In a non-limiting example, the projector brightness default value is ten watts. The controller 14 then determines the total projector brightness value to be a sum of the projector brightness offset value and the projector brightness default value. After block 110, the method 100 proceeds to block 114.

At block 114, the controller 14 determines a subset of the plurality of array LEDs of the LED array 48 of the first embodiment of the graphics projector 28a or the second embodiment of the graphics projector 28b, or a subset of the plurality of LEDs 84 of the third embodiment of the graphics projector 28c. For clarity, block 114 will be explained in terms of the plurality of array LEDs of the LED array 48 of the first embodiment of the graphics projector 28a or the second embodiment of the graphics projector 28b. However, it should be understood that the following discussion also applies to the plurality of LEDs 84 of the third embodiment of the graphics projector 28c. In an exemplary embodiment, the subset of the plurality of array LEDs of the LED array 48 are selected based on the total projector brightness value determined at block 110. In a non-limiting example, each of the plurality of array LEDs provides a predetermined radiant flux output (e.g., one watt). Therefore, by illuminating a subset of the plurality of array LEDs (e.g., ten array LEDs), a given total projector brightness value may be achieved (e.g., ten watts). In another exemplary embodiment, each of the plurality of array LEDs may have a variable radiant flux output (e.g., between one watt and three watts). Therefore, the controller 14 may control the radiant flux output of each of the plurality of array LEDs (e.g., using pulse width modulation or the like) to achieve the given total projector brightness value. In another exemplary embodiment, the subset of the plurality of array LEDs may be determined based at least in part on characteristics (e.g., size, color, contrast, and/or the like) and/or projection location of the graphic to be displayed. After block 114, the method 100 proceeds to block 116.

At block 116, the controller 14 illuminates the subset of the plurality of array LEDs of the LED array 48 of the first embodiment of the graphics projector 28a or the second embodiment of the graphics projector 28b, or the subset of the plurality of LEDs 84 of the third embodiment of the graphics projector 28c determined at block 114. After block 116, the method 100 proceeds to block 118. At block 118, the controller 14 projects the graphic using the TWD system 18 as discussed above. After block 118, the method 100 proceeds to enter a standby state at block 120.

In an exemplary embodiment, the controller 14 repeatedly exits the standby state 120 and restarts the method 100 at block 102. In a non-limiting example, the controller 14 exits the standby state 120 and restarts the method 100 on a timer, for example, every three hundred milliseconds.

The system 10 and method 100 of the present disclosure offer several advantages. By adjusting the projector brightness default value using first brightness offset value and the second brightness offset value, an apparent brightness of graphics displayed using the TWD system 18 may be kept consistent across different environmental conditions (i.e., ambient light levels) and when displaying different graphics (i.e., graphics having different projection areas). Therefore, the system 10 and method 100 may be used to increase occupant comfort and convenience when using the TWD system 18 in the vehicle 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for controlling a brightness of a graphics projector for a vehicle, the system comprising:
   a vehicle sensor;
   the graphics projector including at least one light source module, wherein the at least one light source module further comprises:
      a light-emitting diode (LED) array configured to produce a first source light;
      an optical filter in optical communication with the LED array, wherein the optical filter is configured to receive the first source light and transmit a filtered light; and
      a focusing lens in optical communication with the optical filter, wherein the focusing lens is configured to receive the filtered light and transmit a narrow-beam light; and
   a controller in electrical communication with the vehicle sensor and the graphics projector, wherein the controller is programmed to:
      determine an ambient light level using the vehicle sensor;
      determine a projector brightness offset value based at least in part on the ambient light level; and
      project a graphic using the graphics projector based at least in part on the projector brightness offset value.

2. The system of claim 1, wherein the vehicle sensor is an ambient light sensor configured to measure the ambient light level.

3. The system of claim 1, wherein to determine the projector brightness offset value, the controller is further programmed to:
   determine a first brightness offset value based on the ambient light level;
   determine a second brightness offset value based on a projection area of the graphic; and
   determine the projector brightness offset value to be a sum of the first brightness offset value and the second brightness offset value.

4. The system of claim 3, wherein to determine the second brightness offset value, the controller is further programmed to:
   determine the projection area of the graphic based at least in part on a height of the graphic and a width of the graphic; and
   determine the second brightness offset value based on the projection area of the graphic.

5. The system of claim 1, wherein the graphics projector further comprises:
   an optical collimator in optical communication with the at least one light source module, wherein the optical collimator is configured to receive the narrow-beam light and transmit a collimated light; and
   an optoelectrical mirror in optical communication with the optical collimator, wherein the optoelectrical mirror is in electrical communication with the controller, and wherein the optoelectrical mirror is configured to direct the collimated light.

6. The system of claim 5, wherein the at least one light source module further includes a plurality of light source modules in optical communication with the optical collimator, and wherein the system further comprises:
   an optical waveguide in optical communication with the plurality of light source modules and the optical collimator, wherein the optical waveguide is configured to transmit the narrow-beam light from each of the plurality of light source modules to the optical collimator.

7. The system of claim 6, wherein one of the plurality of light source modules is configured to produce narrow-beam light having a wavelength of 380 nanometers, wherein one other of the plurality of light source modules is configured to produce narrow-beam light having a wavelength of 405 nanometers, and wherein one other of the plurality of light source modules is configured to produce narrow-beam light having a wavelength of 460 nanometers.

8. The system of claim 6, wherein to project the graphic, the controller is further programmed to:
   determine a total projector brightness value, wherein the total projector brightness value is a sum of the projector brightness offset value and a projector brightness default value;

determine a subset of a plurality of LEDs of the LED array of each of the plurality of light source modules to illuminate based at least in part on the total projector brightness value;
illuminate the subset of the plurality of LEDs; and
project the graphic by directing the optoelectrical mirror.

9. The system of claim 1, wherein the light source module further comprises:
an optical manifold light source including:
a plurality of LEDs;
an LED combiner in optical communication with the plurality of LEDs;
a free-form lens in optical communication with the LED combiner; and
a free-form mirror in optical communication with the free-form lens.

10. A method for controlling a brightness of a graphics projector for a vehicle, the method comprising:
determining an ambient light level using an ambient light sensor;
determining a projector brightness offset value based at least in part on the ambient light level; and
projecting a graphic using the graphics projector based at least in part on the projector brightness offset value, wherein the graphics projector further comprises at least one light source module including a light-emitting diode (LED) array configured to produce a first source light, an optical filter in optical communication with the LED array, wherein the optical filter is configured to receive the first source light and transmit a filtered light, and a focusing lens in optical communication with the optical filter, wherein the focusing lens is configured to receive the filtered light and transmit a narrow-beam light.

11. The method of claim 10, wherein determining the projector brightness offset value further comprises:
determining a first brightness offset value based on the ambient light level;
determining a second brightness offset value based on a projection area of the graphic; and
determining the projector brightness offset value to be a sum of the first brightness offset value and the second brightness offset value.

12. The method of claim 11, wherein determining the second brightness offset value further comprises:
determining the projection area of the graphic based at least in part on a height of the graphic and a width of the graphic; and
determining the second brightness offset value based on the projection area of the graphic.

13. The method of claim 10, wherein projecting the graphic further comprises:
the graphics projector further comprising:
an optical collimator in optical communication with the light source module, wherein the optical collimator is configured to receive the narrow-beam light and transmit a collimated light; and
an optoelectrical mirror in optical communication with the optical collimator, wherein the optoelectrical mirror is in electrical communication with the controller, and wherein the optoelectrical mirror is configured to direct the collimated light.

14. The method of claim 13, wherein the at least one light source module further includes a plurality of light source modules in optical communication with the optical collimator, and wherein projecting the graphic further comprises:
the graphics projector further comprising:

an optical waveguide in optical communication with the plurality of light source modules and the optical collimator, wherein the optical waveguide is configured to transmit the narrow-beam light from each of the plurality of light source modules to the optical collimator.

15. The method of claim 14, wherein projecting the graphic further comprises:
determining a total projector brightness value, wherein the total projector brightness value is a sum of the projector brightness offset value and a projector brightness default value;
determining a subset of a plurality of LEDs of the LED array of each of the plurality of light source modules to illuminate based at least in part on the total projector brightness value;
illuminating the subset of the plurality of LEDs; and
projecting the graphic by directing the optoelectrical mirror.

16. A system for controlling a brightness of a graphics projector for a vehicle, the system comprising:
an ambient light sensor;
a graphics projector comprising:
a plurality of light source modules, wherein each of the plurality of light source modules further comprises:
a light-emitting diode (LED) array configured to produce a first source light;
an optical filter in optical communication with the LED array, wherein the optical filter is configured to receive the first source light and transmit a filtered light; and
a focusing lens in optical communication with the optical filter, wherein the focusing lens is configured to receive the filtered light and transmit a narrow-beam light;
an optical collimator in optical communication with the plurality of light source modules, wherein the optical collimator is configured to receive the narrow-beam light and transmit a collimated light;
an optoelectrical mirror in optical communication with the optical collimator, wherein the optoelectrical mirror is in electrical communication with the controller, and wherein the optoelectrical mirror is configured to direct the collimated light; and
an optical waveguide in optical communication with the plurality of light source modules and the optical collimator, wherein the optical waveguide is configured to transmit the narrow-beam light from each of the plurality of light source modules to the optical collimator; and
a controller in electrical communication with the ambient light sensor and the graphics projector, wherein the controller is programmed to:
determine an ambient light level using the ambient light sensor;
determine a projector brightness offset value based at least in part on the ambient light level; and
project a graphic using the graphics projector based at least in part on the projector brightness offset value.

17. The system of claim 16, wherein to determine the projector brightness offset value, the controller is further programmed to:
determine a first brightness offset value based on the ambient light level;
determine a projection area of the graphic based at least in part on a height of the graphic and a width of the graphic;

determine a second brightness offset value based on the projection area of the graphic; and determine the projector brightness offset value to be a sum of the first brightness offset value and the second brightness offset value.

18. The system of claim 17, wherein to project the graphic, the controller is further programmed to:

determine a total projector brightness value, wherein the total projector brightness value is a sum of the projector brightness offset value and a projector brightness default value;

determine a subset of a plurality of LEDs of the LED array of each of the plurality of light source modules to illuminate based at least in part on the total projector brightness value;

illuminate the subset of the plurality of LEDs; and project the graphic by directing the optoelectrical mirror.

* * * * *